United States Patent
Miyazaki

(10) Patent No.: US 8,491,388 B2
(45) Date of Patent: Jul. 23, 2013

(54) GAME SYSTEM AND GAME CONTROLLER

(75) Inventor: Yoshio Miyazaki, Kanagawa (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 556 days.

(21) Appl. No.: 12/270,924

(22) Filed: Nov. 14, 2008

(65) Prior Publication Data

US 2009/0131171 A1 May 21, 2009

(30) Foreign Application Priority Data

Nov. 16, 2007 (JP) ................................. 2007-298122

(51) Int. Cl.
*A63F 13/00* (2006.01)

(52) U.S. Cl.
USPC ................................. 463/37; 463/36; 463/38

(58) Field of Classification Search
USPC .......................................................... 463/37
See application file for complete search history.

(56) References Cited

U.S. PATENT DOCUMENTS

| 6,001,014 A | * | 12/1999 | Ogata et al. | 463/37 |
| 2001/0012801 A1 | * | 8/2001 | Komata | 463/37 |
| 2008/0039200 A1 | * | 2/2008 | Yoshida | 463/37 |
| 2008/0076565 A1 | * | 3/2008 | Okamura | 463/37 |

FOREIGN PATENT DOCUMENTS

JP  2003-519548  6/2003

* cited by examiner

*Primary Examiner* — Paul A. D'Agostino
*Assistant Examiner* — Ankit Doshi
(74) *Attorney, Agent, or Firm* — Katten Muchin Rosenman LLP

(57) ABSTRACT

A controller includes at least one vibrator and a vibration control unit which converts an operation input signal which is input to a predetermined operation button into a vibration control signal so as to be supplied to a vibrator. A motion sensor in a sensor unit detects vibration caused by the drive of the vibrator. Sensor output signal value obtained as a result of the detection by the sensor unit is transmitted from a wireless communication module to a game device. A game device achieves a function of automatically firing in succession in a game, based on the sensor output signal value.

8 Claims, 12 Drawing Sheets

FIG.10

| ms | X-AXIS | ms | X-AXIS |
|---|---|---|---|
| 10 | 502 | 260 | 516 |
| 20 | 512 | 270 | 502 |
| 30 | 515 | 280 | 511 |
| 40 | 502 | 290 | 515 |
| 50 | 514 | 300 | 502 |
| 60 | 513 | 310 | 513 |
| 70 | 502 | 320 | 514 |
| 80 | 515 | 330 | 503 |
| 90 | 512 | 340 | 515 |
| 100 | 502 | 350 | 513 |
| 110 | 516 | 360 | 503 |
| 120 | 510 | 370 | 516 |
| 130 | 503 | 380 | 511 |
| 140 | 517 | 390 | 503 |
| 150 | 508 | 400 | 516 |
| 160 | 505 | 410 | 508 |
| 170 | 518 | 420 | 504 |
| 180 | 506 | 430 | 517 |
| 190 | 506 | 440 | 507 |
| 200 | 517 | 450 | 505 |
| 210 | 505 | 460 | 518 |
| 220 | 508 | 470 | 505 |
| 230 | 517 | 480 | 507 |
| 240 | 503 | 490 | 517 |
| 250 | 509 | 500 | 504 |

GAME SYSTEM AND GAME CONTROLLER

BACKGROUND OF THE INVENTION

1. Field of the Invention

The present invention relates to a game controller equipped with vibrators and a game system including such a game controller.

2. Description of the Related Art

A shooting game is a game in which a virtual bullet is fired aiming at an enemy object from an object within a game space in response to user's operation of a game controller. In such a shooting game, an optional button on the game controller is assigned as a switch for firing a virtual bullet and whenever the button is pressed by a user, a bullet is fired.

In a recent trend, in order to fire more bullets per unit time, a predetermined button on a game controller may be assigned as an automatic fire switch, or otherwise a predetermined button on a game controller may be assigned as a special automatic fire switch by software on a game device side. Using such a switch, the user can effect automatic fire simply by keeping the button depressed instead of pushing it repeatedly. Conventionally, there has also been a proposed type of shooting game in which the number of bullets to be fired is determined by the pressure of firing operation which is sensed by a pressure-sensing means provided in a game controller (See Japanese Patent Application Laid-Open No. 2003-519548, for instance).

In newer game systems realized in recent years, a game controller is equipped with a motion sensor, and the position and motion of the game controller itself are used as operation input data to the game device. As the user moves the game controller, the motion sensor detects the tilt, the amount of rotation, and the like of the game controller and transmits the detected values to the game device, thereby creating game operation input data different from those of conventional button operation. For example, in a racing game, the game controller is handled like a steering wheel of a vehicle, so that the user may play the game with a greater sense of reality than in button operation.

SUMMARY OF THE INVENTION

The present inventor has discovered a new possibility of realizing operation input data not existent with the conventional game devices by effectively utilizing a motion sensor mounted in a game controller.

Accordingly, the present invention provides a technology for using output signals of a motion sensor mounted on a game controller as operation input data to a game device.

In order to resolve the above-described problems, a game system according to one embodiment of the present invention comprises a game controller and a game device for executing a game application. The game controller includes: at least one vibrator wherein a vibration control signal controls drive of the at least one vibrator; a motion sensor configured to detect vibration caused by the drive of the at least one vibrator; an analog-to-digital converter configured to analog-to-digital convert an output signal of the motion sensor; and a first communication module configured to supply a sensor output signal, which has been analog-to-digital converted, to the game device. The game device includes: a second communication module configured to receive the sensor output signal from the game controller; an application processing unit configured to carry out a processing of a game application; and a supply unit configured to supply the received sensor output signal to the application processing unit as game operation data. The application processing unit reflects the game operation data received from the supply unit, in the processing of a game application.

Another embodiment of the present invention relates to a game controller for transmitting game operation data to a game device. The game controller comprises: at least one vibrator; a motion sensor configured to detect a motion of the game controller caused by drive of the at least one vibrator; an operation button operated by a user wherein the operation of the operation button drives the at least one vibrator; a vibration control unit configured to convert an operation input signal which is input to the operation button into a vibration control signal so as to be supplied to the at least one vibrator; an analog-to-digital converter configured to analog-to-digital convert an output signal of the motion sensor; and a communication module configured to supply a sensor output signal, which has been analog-to-digital converted, to the game device.

Optional combinations of the aforementioned constituting elements, and implementations of the invention in the form of methods, apparatuses, systems, recoding media, computer programs and so forth may also be practiced as additional modes of the present invention.

BRIEF DESCRIPTION OF THE DRAWINGS

Embodiments will now be described by way of examples only, with reference to the accompanying drawings which are meant to be exemplary, not limiting, and wherein like elements are numbered alike in several Figures in which:

FIG. 10 shows a concrete example of output signals of a sensor detecting the motion of a controller caused by the vibration of vibrators;

DETAILED DESCRIPTION OF THE INVENTION

The invention will now be described by reference to the preferred embodiments. This does not intend to limit the scope of the present invention, but to exemplify the invention.

Figure 1:
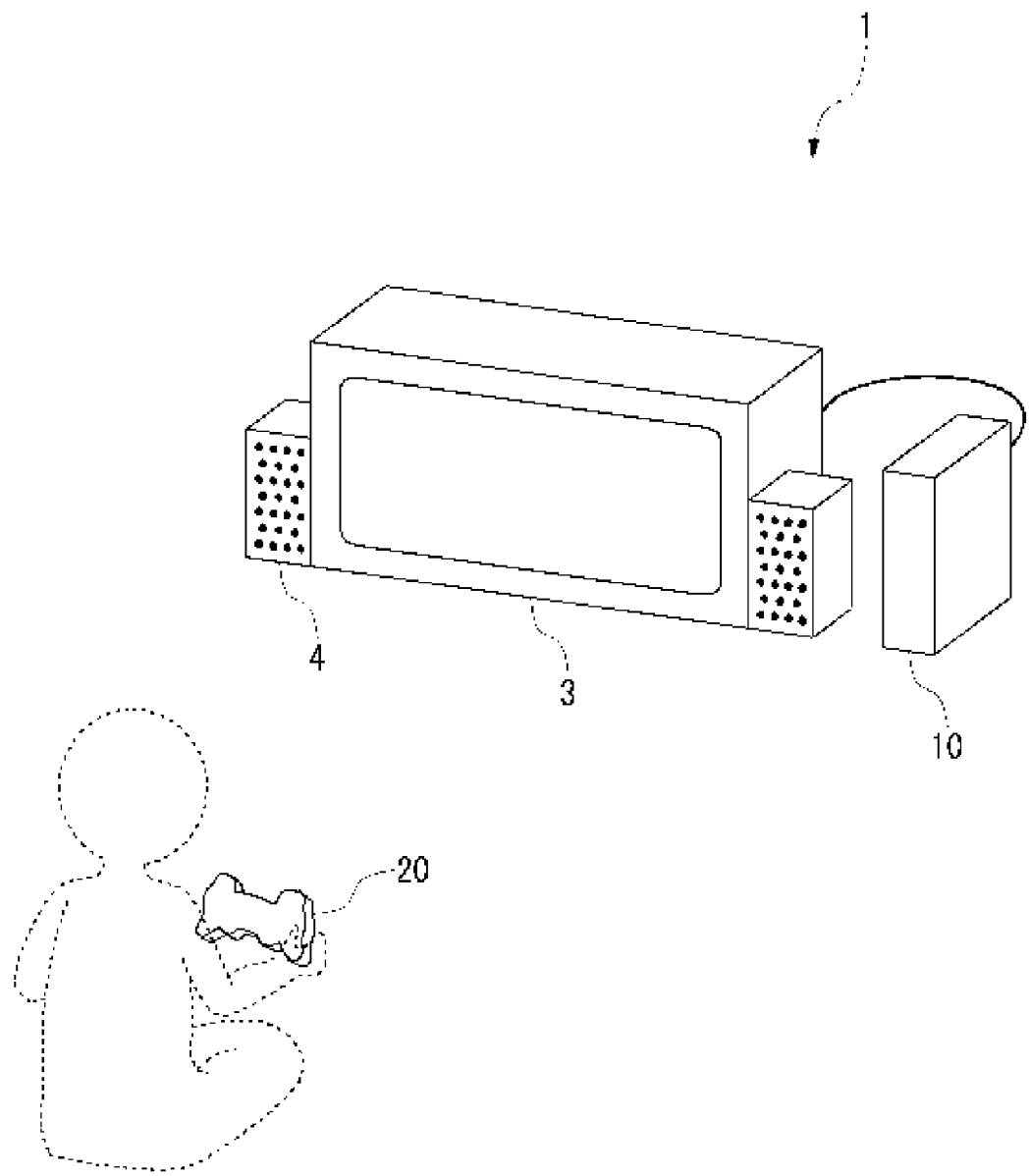
FIG. 1 shows an use environment of a game system according to an exemplary embodiment of the present invention.

FIG. 1 shows a use environment of a game system according to an exemplary embodiment of the present invention. A game system 1 includes an image display unit 3, an audio output unit 4, a game device 10, and a controller 20. The image display unit 3, the audio output unit 4, and the controller 20 are connected to the game device 10.

The image display unit 3 is a display for outputting image signals. The image display unit 3 receives image signals generated by the game device 10, and displays a game screen. The audio output unit 4, which are speakers for outputting sound, receives audio signals generated by the game device 10, and outputs game audio. The image display unit 3 and the audio output unit 4 constitute an output apparatus of the game system 1. The game device 10 and the image display unit 3 may be connected via wire, such as AV cables, or wireless to each other. Also, a home network using network (LAN) cables or a wireless LAN may be formed between the game device 10 and the output apparatus.

The controller 20 is an input device where operation data of a game for a user to operate characters in the game are inputted. The game device 10 is a processor unit which processes game applications based on game operation data supplied from the controller 20 and generates image signals and audio signals representing the processing result of the game applications and audio signals. The game device 10 uses the output signal of a motion sensor supplied from the controller 20 as the game operation data, and also has a function of processing the game applications. The technique described in the present exemplary embodiment can be realized by an entertainment system for executing not only a game application but also other kinds of applications. A description is given hereinbelow of the game system 1, which executes a game application, representing the entertainment system.

The controller 20 has a function of transmitting the game operation data to the game device 10. In the present exemplary embodiment, the controller 20 is structured as a wireless controller capable of performing wireless communication with the game device 10. The controller 20 and the game device 10 may establish wireless communication therebetween using Bluetooth (registered trademark) protocol. In the transmission and reception of the game operation data, the game device 10 functions as a base unit, namely a master unit, whereas the controller 20 functions as a handset, namely a slave unit. It is to be noted here that the controller 20 is not limited to a wireless controller but may be a wired controller connected to the game device 10 through a cable.

The controller 20 is powered by battery (not shown) and is structured by including a plurality of buttons and keys for effecting game inputs to perform a game. When the user operates such buttons and keys on the controller 20, the operation input signals are periodically transmitted wirelessly to the game device 10. Also, the controller 20 is structured by including a 3-axis acceleration sensor for detecting the acceleration of the controller 20 in the 3-axis directions and an angular velocity sensor for detecting the angular velocity around a predetermined axis. The 3-axis acceleration sensor and the angular velocity sensor constitute a sensor that detects the motion of the controller 20. The value detected by each sensor is periodically transmitted wirelessly to the game device 10, and those detected values are handled as game operation data according to the progress of a game. For example, in a racing game where the controller 20 is used as a steering wheel of a vehicle and the user moves the vehicle in the game by moving the controller 20 operating as the steering wheel, the output signal values of the 3-axis acceleration sensor and the angular velocity sensor are utilized as the game operation data.

The game device 10 receives the game operation data on the game application from the controller 20, controls the progress of the game according to the game operation data, and generates game image signals and game audio signals. The game image signals and game audio signals thus generated are outputted from the image display unit 3 and the audio output unit 4, respectively.

In the game systems of recent years, a game controller having a vibrator such as a motor has been in wide use. Driving the vibrator in accordance with the state of a game character gives a virtual sense of reality to the user, which in turn is effective in enhancing the charm of the game. In the game system 1 according to the present exemplary embodiment, the controller 20 is provided with vibrators. The motion sensor detects the vibration of the vibrators caused by the drive of the vibrators, and the values detected by the motion sensor are utilized as the game operation data. This achieves the operation input data to the game device 10 not found in the conventional practice.

The controller 20 has a function of generating vibration control signals, with which to vibrate the controller 20 itself, according to the button operation by the user. The controller 20 converts an operation input signal which is input to the button into a vibration control signal so as to be supplied to the vibrators. While the user keeps pressing down on a predetermined button, the vibration control signal continues to be produced and these signals may be supplied to the vibrators. When a predetermined button of the controller 20 is depressed, the controller may supply a vibration start signal to the vibrators so as to derive the vibrators. When pressing down on the predetermined button has been completed, namely, when the predetermined button is released, the controller 20 may supply a vibration stop signal to the vibrators so as to stop the drive of the vibrators.

The game device 10 may have a function of transmitting the vibration control signal, with which to vibrate the vibrators, to the controller 20 according to the progress of a game application or the button operation by the user. Upon receiving the vibration start signal, the controller 20 drives the vibrators; and upon receiving the vibration stop signal, the controller 20 stops the drive of the vibrators. It is to be noted that the game device 10 may transmit, for each transmission frame, the vibration control signal specifying whether the vibrator is to be driven or not. In such a case, the controller 20 operates based on this control vibration signal. It is to be noted that the vibration control signal supplied to the vibrator in the controller 20 may be a pulse width modulation (PWM) signal or the like which is a different kind of signal from the vibration control signal supplied from the game device 10.

Figure 2:
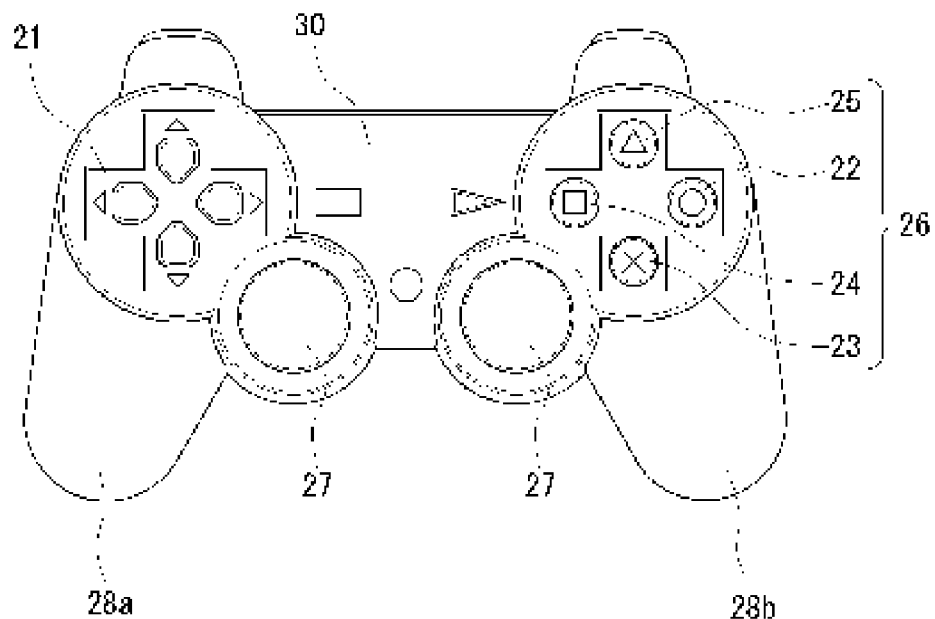
FIG. 2 shows an external structure of a controller.

FIG. 2 shows an external structure of the controller 20. The controller 20 is provided with a direction key 21, analog sticks 27, and four kinds of operation buttons 26. The four kinds of buttons 22 to 25 are distinguished from one another by the marking of different symbols of different colors. That is, the "∘" (circle) button 22 is marked with a red circle, the "x" (cross) button 23 with a blue cross, the "□" (square) button 24 with a purple square, and the "Δ" (triangle) button 25 with a green triangle.

The user operates the controller 20 by holding a left-hand grip 28a with the left hand and a right-hand grip 28b with the right hand. The direction key 21, the analog sticks 27, and the operation buttons 26 are provided on a top surface 30 of a casing so that the user holding the left-hand grip 28a and the right-hand grip 28b can operate them.

Disposed in each of the casings of the left-hand grip 28a and the right-hand grip 28b is a vibrator, which is constituted by a motor and other parts. The left and right vibrators are driven with the supply of a vibration control signal instructing drive, and the vibration is communicated to the casing of the controller 20, which vibrates accordingly. Also, disposed near the center within the casing of the controller 20 is a board which controls the motion of the controller 20. Provided on this board are the aforementioned 3-axis acceleration sensor, angular velocity sensor, and the like. Note also that the casing forming the shell of the controller 20 is structured by a top casing and a bottom casing, which are fitted to each other, and that the vibrators and the board are fixed to the bottom casing.

The motion sensors, such as a 3-axis acceleration sensor and an angular velocity sensor, on the board not only detect the motion of the controller 20, but also detect the vibration of the controller 20 which may occur as the vibrators are driven. In the game system 1 according to the present exemplary embodiment, the vibration of the controller 20 detected by the motion sensors along with the drive of the vibrators is processed as part of operation data for a game. As a result, the vibration of the controller 20 itself may be utilized as operation input signals to a game while the user feels the vibration thereof as he or she operates it. A predetermined button of the controller 20 may be assigned to function as a switch for generating a vibration control signal for driving the vibrators, and at the same time the detected values of motion sensors detecting the vibration of the controller 20 may be utilized as operation input signals in an automatic fire mode of the game, for instance. Thus, the user can enjoy a game with a greater sense of reality as he or she feels the vibration while effecting an automatic fire in the game.

Figure 3:
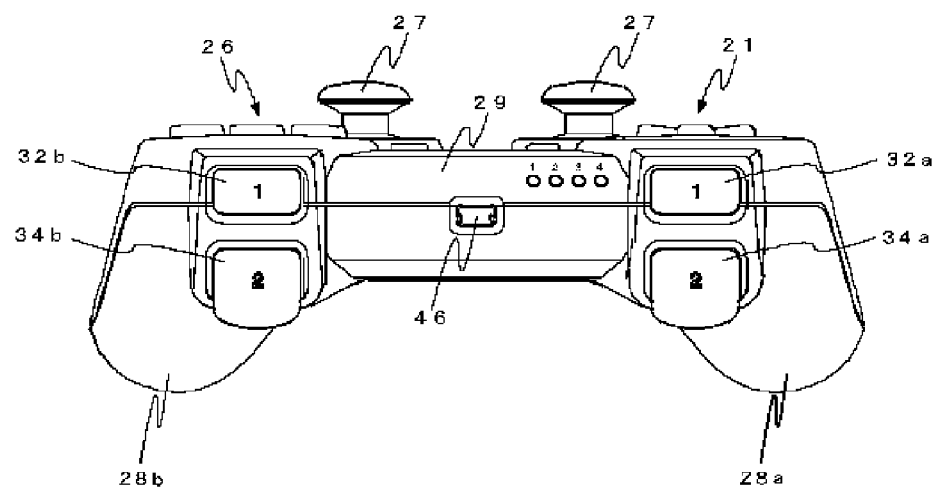
FIG. 3 shows an external structure of a back side of a controller.

FIG. 3 shows an external structure of the back side of the controller 20. As viewed from the back side of the casing, the direction key 21 is provided at an upper right position of the casing, and the operation button 26 at an upper left position thereof. Also, two analog sticks 27 are provided in positions between the direction key 21 and the operation button 26. Provided in the middle part of a casing back 29 is a USB connector 46. A USB cable leading from the game device 10 is connected to the USB connector 46, which allows a charging of the controller 20. It is to be noted that with the USB cable connected, the controller 20 may be used as a wired controller as well.

On the casing back 29 side, an upper operation button 32*a*, an upper operation button 32*b*, a lower operation button 34*a*, and a lower operation button 34*b* are provided in their respective right-left longitudinal symmetrical positions of the casing back 29. The upper operation button 32*a* and the upper operation button 32*b* are positioned such that they can be operated with the tips of the forefingers of the left and right hands respectively of the user holding the left-hand grip 28*a* and the right-hand grip 28*b*. And the lower operation button 34*a* and the lower operation button 34*b* are positioned such that they can be operated with the tips of the middle fingers of the user's left and right hands, respectively.

The upper operation button 32*a* and the upper operation button 32*b* are formed as pushbuttons. An input from either one of or both of the upper operation buttons 32*a* and 32*b*, which is effected by a press of the button, becomes an on-off digital input signal. On the other hand, the lower operation button 34*a* and the lower operation button 34*b* are formed as trigger buttons which are supported rotatably. The lower operation buttons 34*a* and 34*b*, which are each a rotatable input interface, produce an analog input signal corresponding to the amount of rotation. It is to be noted that the upper operation buttons 32*a* and 32*b* may also be formed as an input interface capable of producing analog input signals. The lower operation buttons 34*a* and 34*b* are each supported rotatably by a rotating shaft and biased toward the outside of the casing by a spring or the like. As a result, unless pressed by the user, the lower operation buttons 34*a* and 34*b* remain in their respective positions, biased in the direction away from the casing. Hereinafter, "upper operation button 32" and "lower operation button 34" indicate either one of or both of "upper operation buttons 32*a* and 32*b*" and either one of or both of "lower operation buttons 34*a* and 34*b*", respectively.

In the controller 20, the lower operation buttons 34*a* and 34*b* are each supported rotatably by a rotating shaft which is disposed substantially parallel to the longitudinal direction of the casing back 29. The lower operation buttons 34*a* and 34*b* are each supported rotatably in the upper portion thereof, so that a press on the lower portion of the surface of the lower operation buttons 34*a* and 34*b* by the user causes the lower operation buttons 34*a* and 34*b* to be turned inward into the casing. Formed at the lower end of the surface of the lower operation buttons 34 is a projection protruding in a direction away from the rotating shaft, or more specifically downward or diagonally downward. Therefore, the projection is disposed on the side of the casing back with respect to the rotating shaft.

A capacitance type sensor may be employed as a means for detecting the amount of rotation of the lower operation button 34. The capacitance type sensor can detect the amount of rotation of the lower operation button 34 by detecting the change in capacitance between two electrodes. Thus, a means for detecting the capacitance between the electrodes as an analog value is provided in the controller 20, and the analog value obtained by the detecting means is converted into a digital value corresponding to the amount of rotation. In this manner, the controller 20 can obtain an input signal value corresponding to the amount of rotation.

In another example, a sensor for detecting resistance change may be employed as a means for detecting the amount of rotation of the lower operation button 34. For example, a circuit pattern conducting electricity between two terminals at a predetermined resistance may be provided in the casing, and a conductive rubber may be provided at the end of the turning direction of the lower operation button 34. As the lower operation button 34 is turned, the conductive rubber provided at the end of the turning direction comes into contact with the circuit pattern inside the casing. The conductive rubber is formed deformably so that the area of contact thereof with the circuit pattern changes with the amount of rotation, thus changing the resistance value between the two terminals according to the amount of rotation. In this manner, the amount of rotation can be detected by detecting the above-mentioned resistance value, and the controller 20 can obtain an input signal value corresponding to the amount of rotation.

Figure 4A:
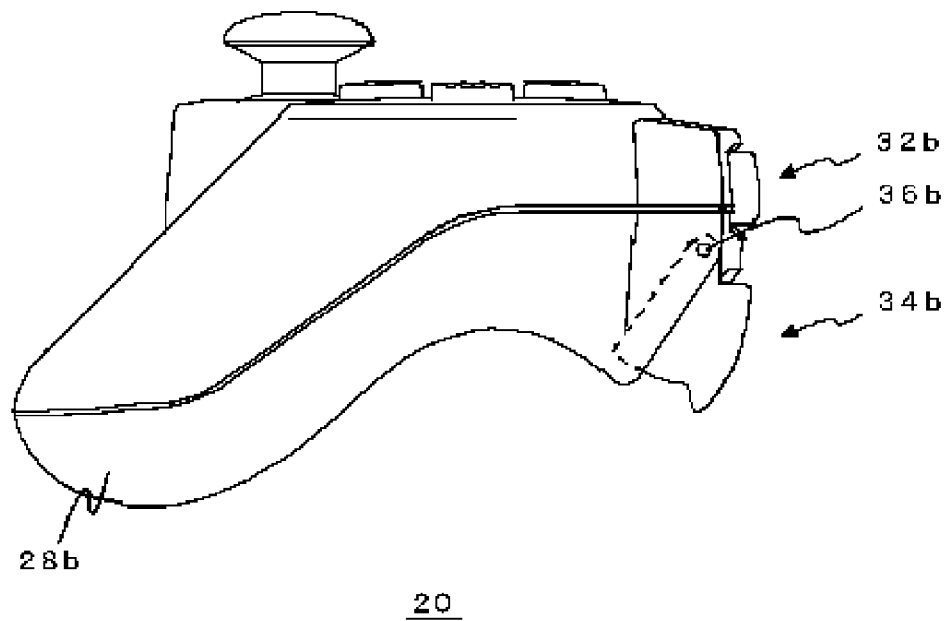
FIG. 4A and FIG. 4B show an external structure of a side of a controller.
Figure 4B:
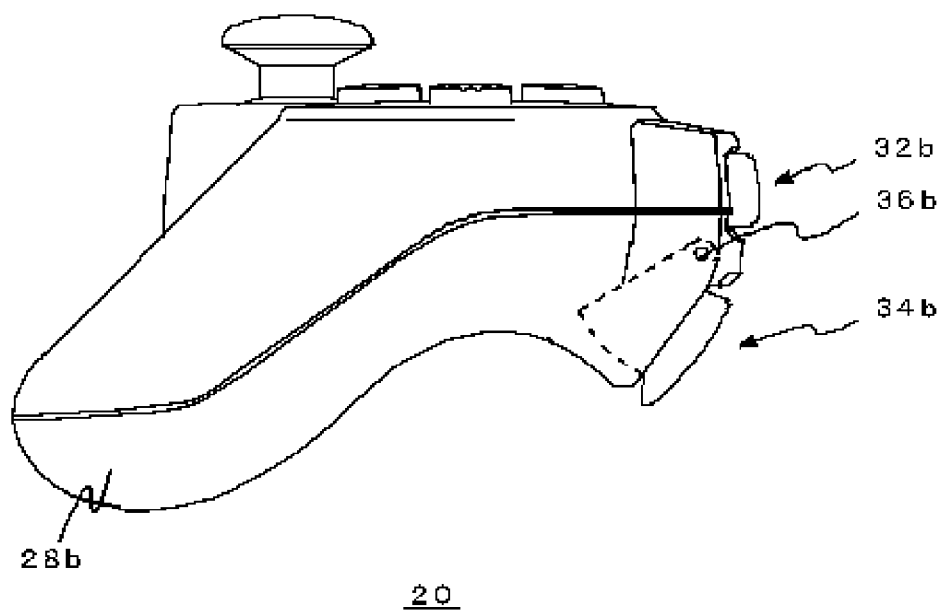

FIGS. 4A and 4B show an external structure of a side of the controller 20. FIGS. 4A and 4B show a lower operation button 34*b* as viewed from the right-hand side of the controller 20, and it is to be noted that a lower operation button 34*a* which can be seen from the left-hand side has also the same structure. FIG. 4A illustrates the lower operation button 34*b* in a state not yet turned, and FIG. 4B the lower operation button 34*b* having been turned fully around a rotating shaft 36*b*. When the lower operation button 34*b* is turned, the projection thereon functions as a stopper by limiting the turning motion as it comes into contact with the external surface of the casing, or more specifically the edge portion of an opening. Note also that, as illustrated, a shell portion of the casing forming the opening may be inclined downward to make the amount of rotation, namely, the stroke of the lower operation button 34 larger. And larger stroke means a wider range of analog values that can be inputted.

In a game system 1 according to the present exemplary embodiment, the function of a switch for driving a vibrator provided inside the casing is assigned to the lower operation button 34. The lower operation buttons 34*a* and 34*b* may be assigned to function as switches to drive the vibrators disposed on the left side and right side respectively, but also either one of the lower operation buttons 34a and 34b may be assigned to function as a switch to drive both the vibrators.

In the game system 1, the vibration frequency of the vibrator or vibrators may be controlled according to the amount of rotation of the lower operation button 34. Also, the amplitude of vibration may be controlled as well. As the casing vibrates along with the drive of the vibrator, the motion sensor detects the vibration. In the game system 1, the automatic fire function of a game is realized based on the vibration thus detected.

Figure 5:
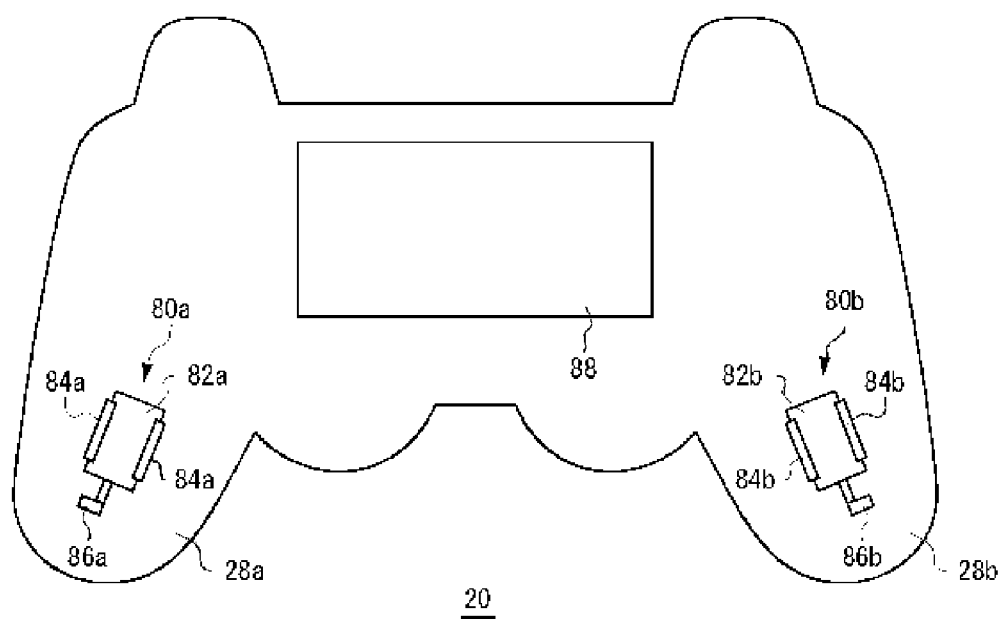
FIG. 5 shows an arrangement of a board and vibrators fixed to a bottom casing as a board and vibrators are exposed with a top casing of a controller removed.

FIG. 5 shows an arrangement of a board and vibrators fixed to the bottom casing as they are exposed with the top casing of the controller removed. A board 88, which has a horizontally long shape, is fixed in a front center position of the bottom casing. A vibrator 80a, which has a motor 82a and an eccentric member 86a attached to an end of a motor shaft, is fixed to a position of the left-hand grip 28a of the bottom casing, held by a pair of clamps 84a. Similarly, a vibrator 80b, which has a motor 82b and an eccentric member 86b, is fixed to a position of the right-hand grip 28b of the bottom casing, held by a pair of clamps 84b. The eccentric members 86a and 86b each having a semicircular shape is fixed to the motor shaft eccentrically and vibrates the casing when the motor shaft rotates. Hereinafter, "vibrator 80" indicates either one of or both of "vibrators 80a and 80b".

Figure 6:
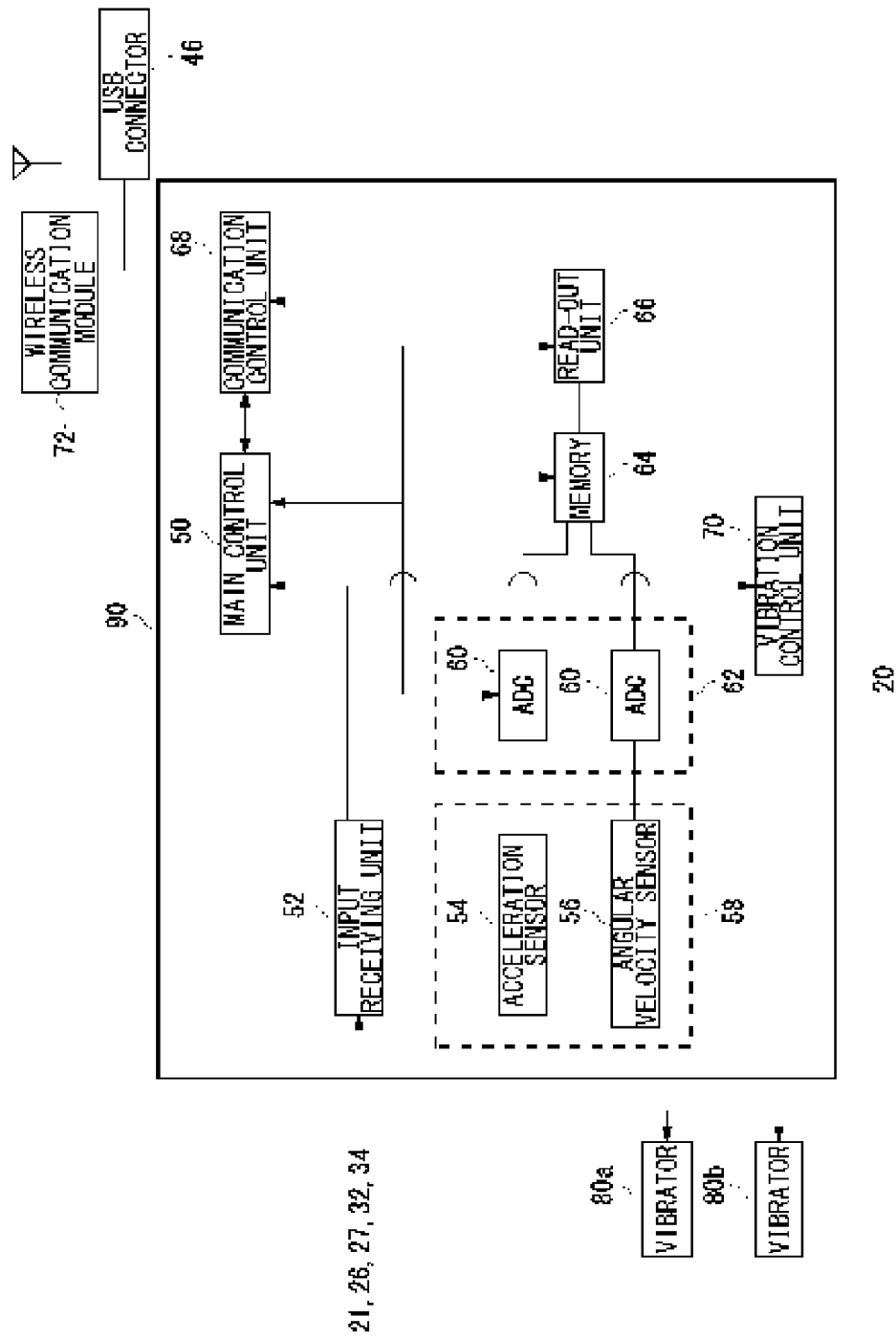
FIG. 6 shows an internal structure of a controller.

FIG. 6 shows an internal structure of the controller 20. The controller 20 includes a processor 90, vibrators 80a and 80b, which are each constituted by a motor and an eccentric member, a wireless communication module 72, and a USB connector 46. The wireless communication module 72 has a function of wirelessly transmitting and receiving data to and from a wireless communication module of a game device or game devices 10. If one end of a USB cable connected, at the other end thereof, to a USB connector of the game device 10 is inserted into the USB connector 46, then the controller 20 can perform wired transmission and reception of data to and from the game device 10. The processor 90 carries out processings expected of the controller 20. The functions of the processor 90 and the wireless communication module 72 may also be realized by circuitry built into the board 88 provided inside the casing.

The processor 90 includes a main control unit 50, an input receiving unit 52, a sensor unit 58, an analog-to-digital conversion unit 62, a memory 64, a read-out unit 66, a communication control unit 68, and a vibration control unit 70. The communication control unit 68 sends and receives necessary data to and from the wireless communication module 72. The following description is about a case where a wireless communication takes place between the controller 20 and the game device 10. However, note that communication may take place between the controller 20 and the game device 10 by the use of a USB cable also.

The input receiving unit 52 receives operation input signals from input units, such as the direction key 21, operation buttons 26, analog sticks 27, upper operation buttons 32, and the like, and sends them to the main control unit 50. The main control unit 50 supplies the received operation input signal to the memory 64 where it is stored. The operation input signal values from the respective input units are stored by overwriting in the respectively assigned areas of the memory 64.

The communication control unit 68 controls the transmission processing by the wireless communication module 72 with a predetermined period. Since the frame period of game image for the game device 10 is set at 1/60 seconds, the transmission period of the wireless communication module 72 is set to a period of 1/60 seconds or shorter, for instance, 11.25 ms. The read-out unit 66 reads out data from the memory 64 in time with the transmission period of the wireless communication module 72 and supplies the data to the communication control unit 68. Since the operation input values from the respective input units are stored by overwriting in their respective memory areas, the read-out unit 66 can supply the latest game operation data to the communication control unit 68.

The sensor unit 58 includes an acceleration sensor 54 and an angular velocity sensor 56. Where the sensor unit 58 is to include a 3-axis acceleration sensor, the sensor unit 58 is constituted by including three acceleration sensors 54. The acceleration sensor 54 detects the motion of the controller 20 in a predetermined axial direction, whereas the angular velocity sensor 56 detects the motion of the controller 20 around a predetermined axis. In the present exemplary embodiment, as the acceleration sensor 54 and/or the angular velocity sensor 56 detect the vibration of the controller 20 along with the drive of the vibrator 80, the detected value is utilized as game operation data for the game application, for example, for the execution of the automatic fire function.

The analog-to-digital conversion unit 62 includes a plurality of analog-to-digital converters (ADCs) 60. Each of the ADCs 60 converts analog signals outputted from the sensor unit 58 to digital signals. The sampling period is preferably set shorter than the transmission period of the wireless communication module 72; it may, for instance, be about 2 ms. Also, the analog-to-digital conversion unit 62 may keep a fixed sampling period, and the sampling period may be controlled desirably by the main control unit 50. The ADCs 60 overwrite sampled values in their assigned areas of the memory 64.

As already described above, the read-out unit 66 reads out data from the memory 64 in time with a specific transmission period of the wireless communication module 72 and supplies the data to the communication control unit 68. Since the sensor output signal values supplied from the respective ADCs 60 are stored by overwriting in their respective memory areas, the read-out unit 66 can supply the latest sensor output signal value to the communication control unit 68. The communication control unit 68 has the wireless communication module 72 transmit sensor output signals obtained by the motion sensors, such as the acceleration sensor 54 and the angular velocity sensor 56, together with operation values from the operation buttons 26 and the like received by the input receiving unit 52, as game operation data to the game device 10.

In the controller 20 of the present exemplary embodiment, the input receiving unit 52 sends operation input signals from the lower operation buttons 34a and 34b, as soon as it receives the input signals, to the vibration control unit 70. In this exemplary embodiment, the lower operation buttons 34a and 34b are the buttons for driving the vibrator 80 by producing analog input signals corresponding to the amount of operation, namely, the amount of rotation, by the user. The vibration control unit 70 converts the received operation values into vibration control signals and supplies them to the vibrator 80.

The vibration control unit 70 has a function of determining the vibration frequency of the vibrator 80 according to the amount of operation of the lower operation button 34. The vibration control unit 70 produces vibration control signals such that the greater the amount of operation thereof, the higher the vibration frequency of the vibrator 80 will be, and the smaller the amount of operation thereof, the lower the vibration frequency of the vibrator 80 will be.

Figure 7A:
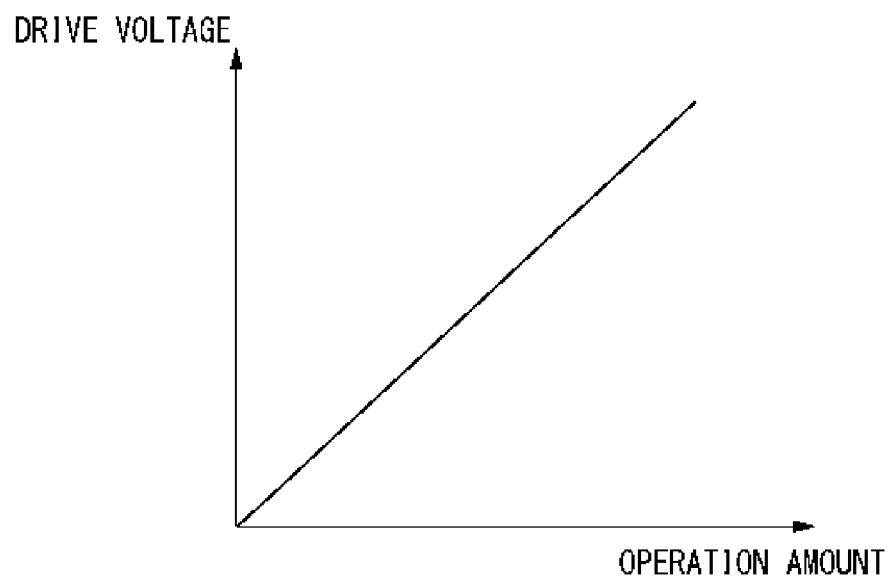
FIG. 7A shows a relationship between the amount of operation of an operation button and a drive voltage supplied to a vibrator.

FIG. 7A shows a relationship between the amount of operation of an operation button and the drive voltage supplied to a vibrator. The vibration frequency of the vibrator 80 can be raised by so arranging that the greater the amount of operation of the operation button 34, the higher the drive voltage supplied to the vibrator 80 will be. Hence, the farther the user pushes the lower operation button 34, the higher the vibration frequency will be at which the vibrator 80 is driven, thus increasing the vibration of the controller 20.

Also, the vibration control unit 70 may have a function of determining the vibration amplitude of the vibrator 80 according to the amount of operation of the lower operation button 34. For example, the vibration control unit 70 may determine the vibration amplitude of the vibrator 80 by adjusting the duty ratio of vibration control signals to be supplied to the vibrator 80. The vibration control unit 70 may produce vibration control signals such that the greater the amount of operation of the lower operation button 34, the greater the vibration amplitude of the vibrator 80 will be, and the smaller the amount of operation of the lower operation button 34, the smaller the vibration amplitude of the vibrator 80 will be.

Figure 7B:
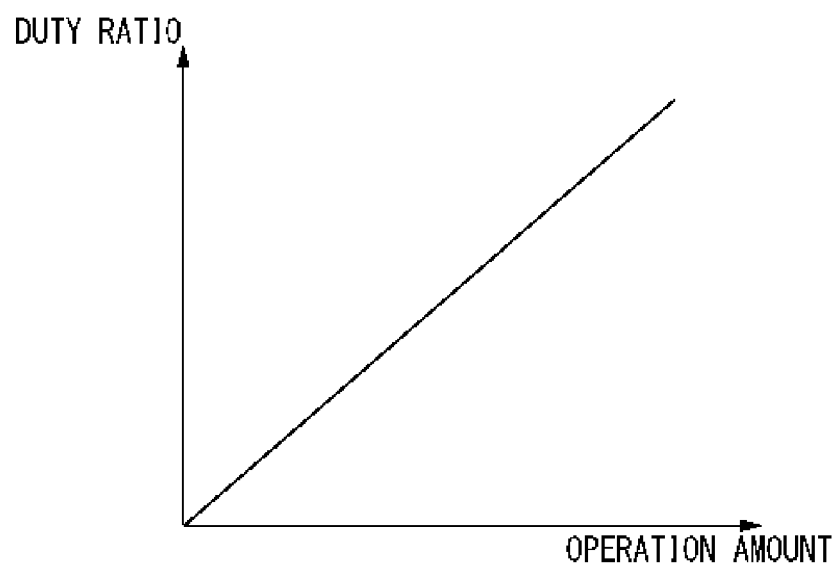
FIG. 7B shows a relationship between the amount of operation of an operation button and the duty ratio of PWM signals supplied to a vibrator.

FIG. 7B shows a relationship between the amount of operation of an operation button and the duty ratio of PWM signals supplied to a vibrator. The vibration amplitude of the vibrator 80 can be increased by so arranging that the greater the amount of operation of the operation button 34, the higher the duty ratio of vibration control signals supplied to the vibrator 80 will be. Hence, the farther the user pushes the lower operation button 34, the greater the vibration amplitude will be at which the vibrator 80 is driven, thus increasing the vibration of the controller 20.

As described above, the vibration control unit 70 produces vibration control signals to adjust the vibration frequency and/or vibration amplitude of the vibrator 80 according to the amount of operation of the lower operation button 34 and supplies them to the vibrator 80. And this causes the controller 20 to vibrate at the vibration frequency and/or vibration amplitude corresponding to the amount of operation of the lower operation button 34, and the user can feel the vibration through his/her hands. At this time, the motion sensor, which comprises an acceleration sensor 54 and an angular velocity sensor 56, detects the vibration of the controller 20 caused by the drive of the vibrator 80. This sensor output signal is sent from the wireless communication module 72 to the game device 10 to be utilized as game operation data to execute the automatic fire function.

Figure 8:
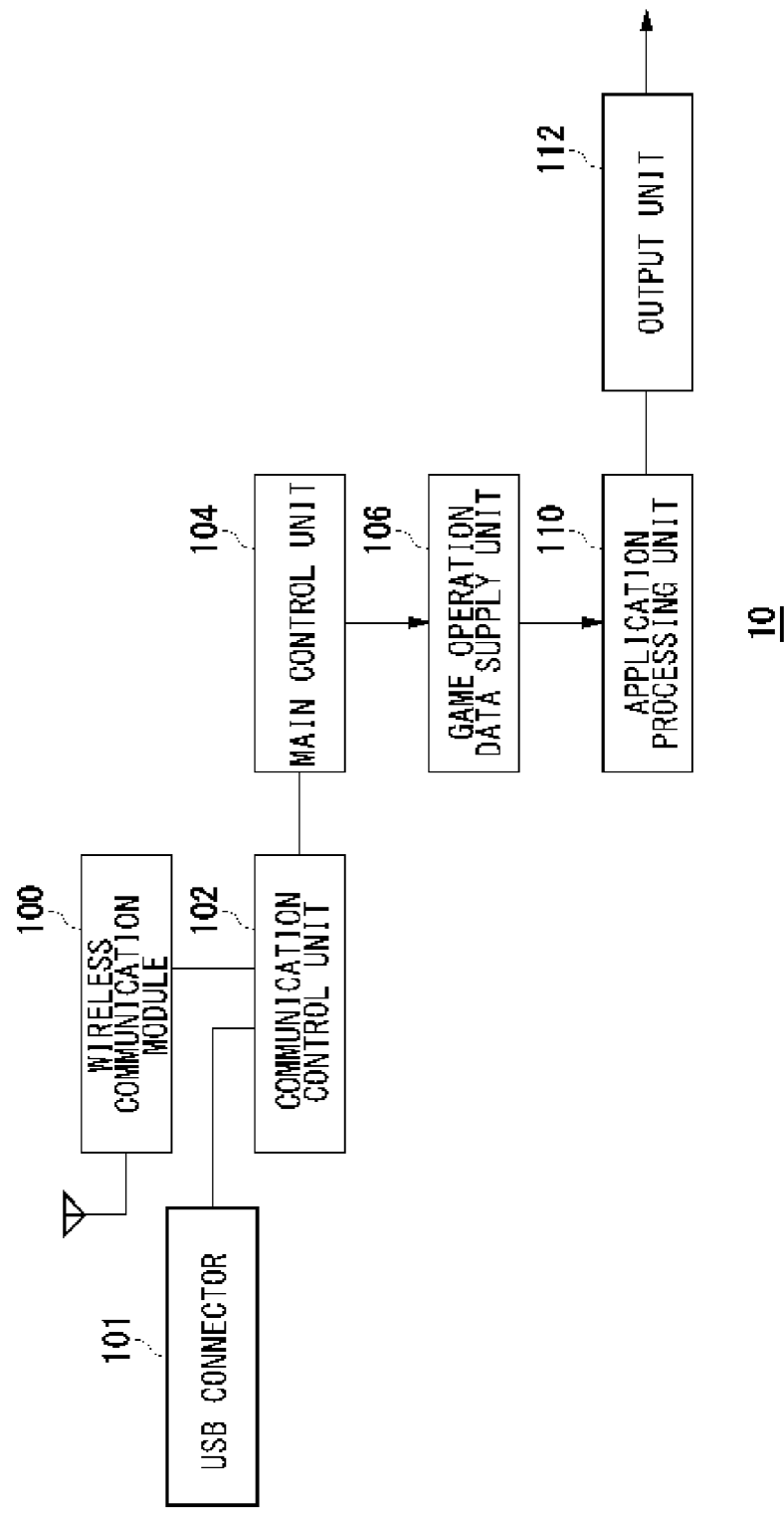
FIG. 8 shows a structure of a game device.

FIG. 8 shows a structure of the game device 10. The game device 10 includes a wireless communication module 100, a USB connector 101, a communication control unit 102, a main control unit 104, a game operation data supply unit 106, an application processing unit 110, and an output unit 112. In the present exemplary embodiment, the processing functions of the game device 10 are realized by the CPU, memory, programs loaded in the memory, and the like, and the exemplary embodiment described herein is implemented through the cooperation therebetween. Such programs may be built into the game device 10, or may be ones to be supplied externally from a recording medium where they are stored. Hence, it is understood by those skilled in the art that these function blocks can be realized in a variety of forms such as by hardware only, software only, or the combination thereof. In the example of FIG. 8, the CPU of the game device 10 realizes the functions of the communication control unit 102, the main control unit 104, the game operation data supply unit 106, and the application processing unit 110. It is also to be noted that the game device 10 may have a plurality of CPUs for the purpose of hardware configuration. In such a case, one CPU may function as the communication control unit 102 to control the operation of the wireless communication module 100; another CPU may function as the main control unit 104 to control the overall operation of the game device 10; another CPU may function as the application processing unit 110 to execute a game application; and still another CPU may function as the game operation data supply unit 106 to supply game operation data to the application processing unit 110.

The communication control unit 102 controls the communication processing by the wireless communication module 100 by sending and receiving necessary data to and from the wireless communication module 100, and the wireless communication module 100 establishes wireless communication with the wireless communication module 72 of the controller 20. The wireless communication module 100 and the wireless communication module 72 establish a connection therebetween by the Bluetooth (registered trademark) protocol, for instance. The wireless communication module 72 of the controller 20 transmits data, such as game operation data, with a predetermined period, and the communication control unit 102 supplies the data received by the wireless communication module 100 to the main control unit 104. Note that in a setup where one end of a USB cable connected, at the other end thereof, to a USB connector 46 of the controller 20 is inserted into the USB connector 101, the communication control unit 102 may control the processing of communication with the controller 20 by way of the USB cable.

The main control unit 104 supplies the operation input values and sensor output signal values supplied from the controller 20 to the game operation data supply unit 106. The game operation data supply unit 106 converts the received operation input values and sensor output values into game operation data and supplies them to the application processing unit 110. When there is a predetermined operation input from the user, the game operation data supply unit 106 may carry out a processing to produce game operation data for the automatic fire mode. For example, the arrangement may be such that both the shifting to and ending of the automatic fire mode are effected by a simultaneous press on the two lower operation buttons 34*a* and 34*b* by the user and that the game operation data supply unit 106 determines the timing for producing game operation data for the automatic fire mode upon detecting the simultaneous press on the lower operation buttons 34*a* and 34*b*. The application processing unit 110 has the game operation data received from the game operation data supply unit 106 reflected in the processing of the game application. In other words, the application processing unit 110 executes the automatic fire mode in a game, using the game operation data corresponding to the sensor output values.

Figure 9A:
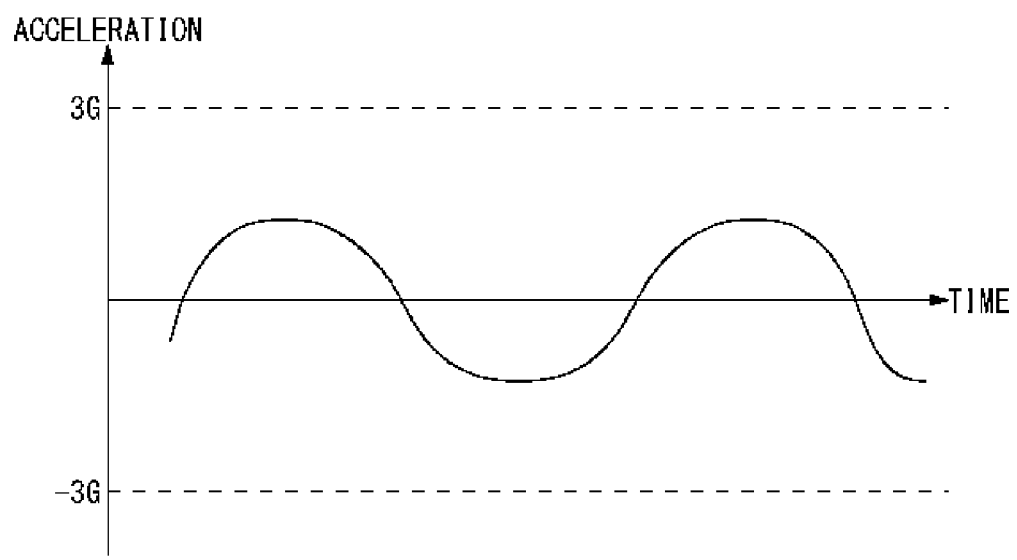
FIGS. 9A and 9B show an output signal of a sensor detecting the motion of a controller caused by the drive of a vibrator.
Figure 9B:
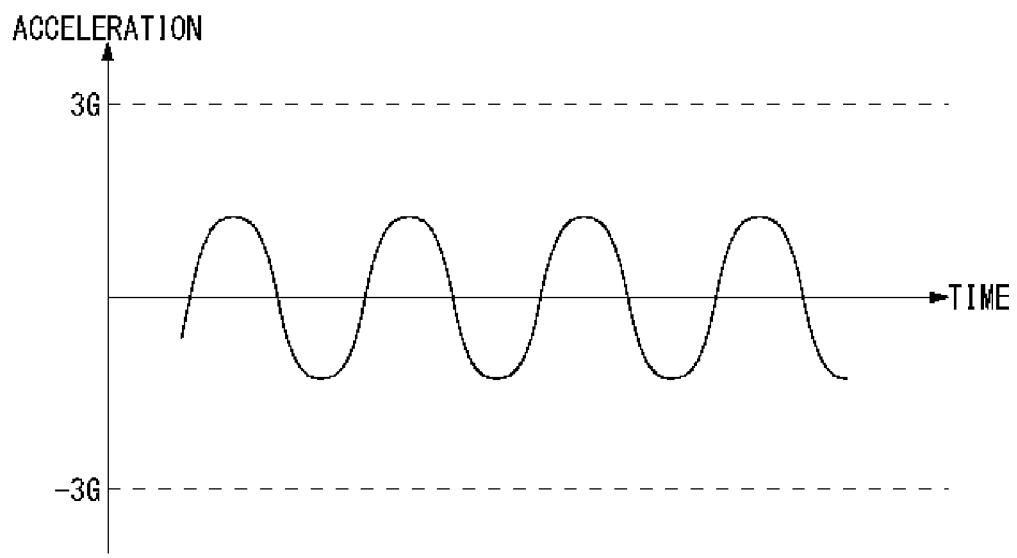

FIG. 9 shows the output signal of a sensor detecting the motion of a controller caused by the drive of the vibrator. This sensor output signal may be an acceleration sensor output signal of the Z-axis component (vertical component), or may be an acceleration sensor output signal of another axis component, or may even be an angular velocity sensor output signal. FIG. 9A shows a sensor output signal when the vibrator is driven at low vibration frequency, whereas FIG. 9B shows a sensor output signal when the vibrator is driven at relatively high vibration frequency. The game operation data supply unit 106 converts this sensor output signal value into game operation data and supplies them to the application processing unit 110.

The game operation data supply unit 106 may determine the number of virtual bullets to be fired per unit time in the automatic fire mode, for instance, by measuring the sensor output period and may supply the information as game operation data to the application processing unit 110. A short sensor output period means the drive of the vibrator 80 at a high vibration frequency. However, by vibrating the controller 20 violently and at the same time increasing the number of bullets fired per unit time in automatic fire in the game, it is possible to have the user experience bodily the relationship between the vibration of the controller 20 and the number of bullets fired. That is, in this case, the higher the vibration frequency of the controller 20 is, the greater the number of bullets fired by a game character is, so that the user can virtually experience a violent firing of bullets.

Also, the game operation data supply unit 106 may determine the number of virtual bullets to be fired per unit time in the automatic fire mode by measuring the sensor output amplitude and may supply the information as game operation data to the application processing unit 110. A large sensor output amplitude means a large motion of the controller 20. However, by vibrating the controller 20 largely and at the same time increasing the number of bullets fired per unit time in automatic fire in the game, it is possible to have the user experience bodily the relationship between the vibration of the controller 20 and the number of bullets fired. That is, in this case, the greater the number of bullets fired by a game character is, the larger the vibration amplitude of the controller 20 is, so that the user can virtually experience a violent firing of bullets.

Note also that the game operation data supply unit 106 may determine the flying distance of bullets by measuring the sensor output amplitude. That is, it can make the flying distance of bullets longer if the amplitude of sensor output signal is large or shorter if it is small. This allows the user to bodily experience the relationship between the vibration of the controller 20 and the flying distance of bullets. It is also to be noted that the game operation data supply unit 106 may determine the number of virtual bullets to be fired per unit time based on the sensor output period and at the same time may determine the flying distance of bullets by the amplitude of sensor output signal.

Figure 11:
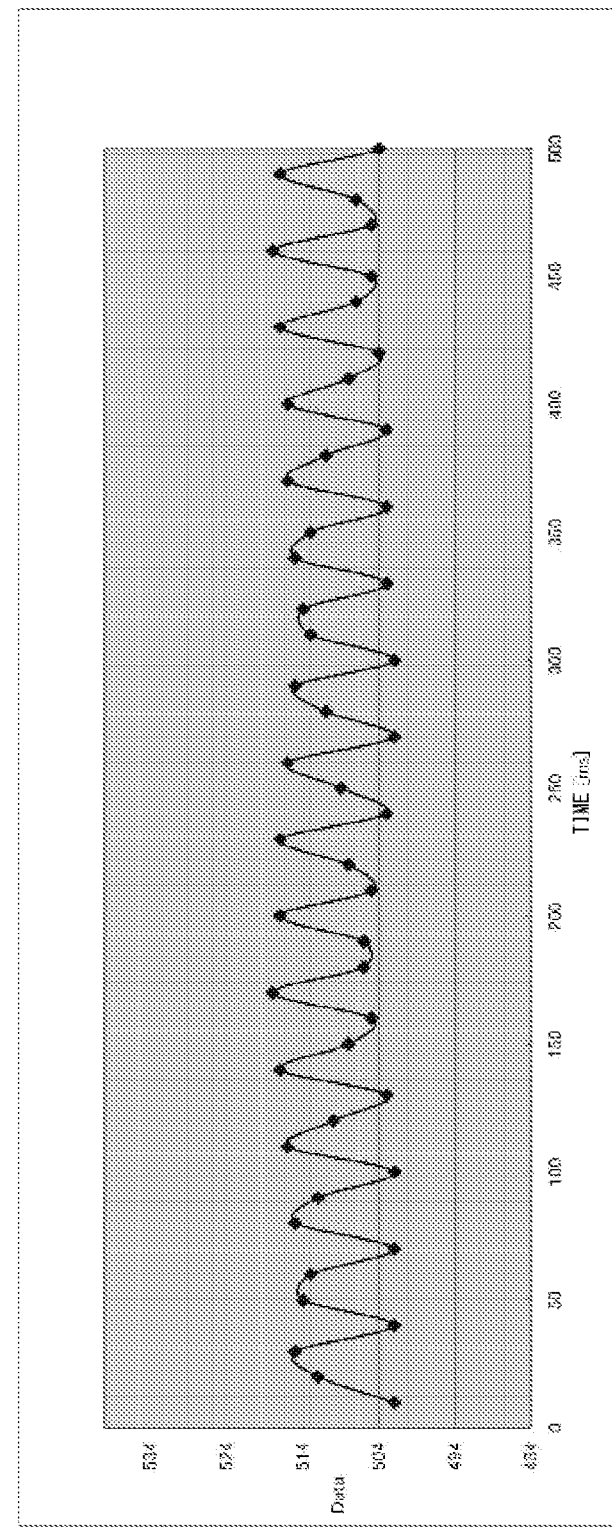
FIG. 11 shows in a curved line the sensor output signals shown in FIG. 10 plotted on the time axis.

FIG. 10 shows a concrete example of output signals of a sensor detecting the motion of a controller caused by the vibration of vibrators. These sensor output signals represent acceleration sensor output signals of the X-axis component transmitted every 10 milliseconds. FIG. 11 shows in a curved line the sensor output signals shown in FIG. 10 plotted on the time axis.

The game operation data supply unit 106 may set a reference value for sensor output signal. And the game operation data supply unit 106 may supply game operation data for firing a virtual bullet to the application processing unit 110 when it has detected the sensor output signal going above the reference value from a value equal to or below it or when it has detected the sensor output signal going down to or below the reference value from a value above it. The reference value may be a predetermined fixed value, or, as will be described later, it may be set according to the game environment. In the example of FIG. 10 and FIG. 11, the game operation data supply unit 106 sets the reference value at 512, for instance, and produces and supplies game operation data for firing a virtual bullet to the application processing unit 110 when the sensor output signal has gone above 512. During the period from 0 to 200 ms, the sensor output signal value goes above 512 from a value equal to or below it at 30 ms, 50 ms, 80 ms, 110 ms, 140 ms, 170 ms, and 200 ms. The game operation data supply unit 106 produces game operation data for firing a virtual bullet when it determines that the sensor output signal has gone above the reference value. Therefore, in this example, a total of seven virtual bullets are fired automatically during the period of 200 milliseconds.

The application processing unit 110 may perform a processing such that a virtual bullet is fired when it receives game operation data concerning the pressing of a predetermined operation button 26 by the user. More specifically, the on state (pressed state) and the off state (released state) of the predetermined operation button 26 are handled as binary signals of "0" and "1" respectively, and the application processing unit 110 performs a processing to fire a virtual bullet when the state of the operation button 26 has shifted from the on state to the off state. That is, the application processing unit 110 performs a processing to fire a virtual bullet when the status value (operation data) of the predetermined operation button 26 shifts from "0" to "1". Using this arrangement, the game operation data supply unit 106 may convert a sensor output signal equal to or below the reference value to "0" and a sensor output signal above the reference value to "1" and may supply the converted value as game operation data to the application processing unit 110. After the processing of a converted value of sensor output signal in the same manner as with the status value of the operation button 26, the application processing unit 110 can perform a processing to fire a virtual bullet when the converted value shifts from "0" to "1". As a result, a virtual bullet is fired when the sensor output signal goes above the reference value from a value equal to or below it, so that it becomes possible to automatically fire a plurality of virtual bullets in succession within a short time.

The game operation data supply unit 106 may produce game operation data for firing a virtual bullet when the number of times of the sensor output signal going above the reference value has reached a predetermined number of times. The game operation data supply unit 106 counts the number of times of the sensor output signal going above the reference value and produces game operation data at a rate of once every predetermined number of times. In this manner, the game operation data supply unit 106 can adjust the automatic firing rate.

The game operation data supply unit 106 may monitor the operation input values it receives. And when the game operation data supply unit 106 decides that an operation input of a lower operation button 34 has occurred after a state without the operation input thereof, it may set the sensor output signal immediately before it as the reference value. In other words, the game operation data supply unit 106 monitors the content of operation input values, and when it decides that vibration has started with an operation of a lower operation button 34, it employs the sensor output signal value immediately before the start of vibration as the reference value. By the use of the sensor output signal value immediately before the start of vibration as reference, it is now possible to acquire sensor output signals swinging above and below the reference value.

Also, upon detecting an operation input of a lower operation button 34 after a state without the operation input thereof, the game operation data supply unit 106 may calculate an average value of a predetermined number of sensor output signals thereafter and employ the average value as the reference value. For example, by referring to FIG. 10 and FIG. 11, the game operation data supply unit 106 averages the five sensor output signal values from the start of vibration to 50 ms ((502+512+515+502+514)/5) and sets the average of 509 as the reference value. By obtaining a reference value based on sensor output signal values during vibration, it is possible to set a reference value appropriate for the actual use environment, such as the position and orientation of the controller 20 and the like.

When the sensor output signals are high or low relative to the set reference value a predetermined number of times consecutively, the game operation data supply unit 106 may also change the reference value. For instance, the set reference value is deemed too low if the sensor output signals are higher than the reference value ten times consecutively. Hence, the game operation data supply unit 106 counts the number of times of the sensor outputs being higher or lower than the reference value consecutively and changes the reference value when the number of times has reached a predetermined number of times. The game operation data supply unit 106 may also reset the reference value by averaging a predetermined number of sensor output signal values or by adding or subtracting a predetermined value to or from the set reference value.

Although it is the acceleration component of the X axis that is shown in FIG. 10 and FIG. 11, the game operation data supply unit 106 may produce game operation data, using the acceleration component of another axis. Also, the game operation data supply unit 106 may produce game operation data, using the acceleration components of a plurality of axes. For example, the game operation data supply unit 106 may determine the timing of the reference value being exceeded from the acceleration components of the X axis and Y axis and may produce game operation data when there is a match between the determined timings for both the axes.

The game operation data supply unit 106 may change the power of a virtual bullet according to the extent of swing from the reference value. For example, when the absolute value of (sensor output signal value−(minus) reference value) is greater than or equal to a predetermined value at the point of producing game operation data, the game operation data supply unit 106 may produce such game operation data that the power of a virtual bullet is greater than usual.

The application processing unit 110 produces image signals and audio signals to reflect game operation data in the motions of game characters and sends them from the output unit 112 to the image display unit 3 and the audio output unit 4, respectively. For instance, the application processing unit 110 produces image signals and audio signals for automatic fire of virtual bullets in the game from game operation data and supplies them to the image display unit 3 and the audio output unit 4, respectively. In this manner, the application processing unit 110 produces game image signals and game audio signals to realize the automatic firing rate, travel distance of bullets, and the like adjusted according to the vibration frequency and amplitude of the controller 20, thus realizing a new sense of the game world which fuses the actual vibration of the controller 20 with the automatic firing rate in the game. In such a game, the controller 20 starts vibrating when an automatic fire starts and stops vibrating when it stops.

The description so far has dealt with processings for a shooting game. In a fight game, on the other hand, sensor outputs may be reflected in the number of punches and/or kicks delivered by a character, the strength of the character's punches, and the like. For example, for shorter periods of sensor outputs, the number of punches and/or kicks may be increased, whereas for longer periods of sensor outputs, it may be decreased. At the same time, the strength of punches and/or kicks may be increased for greater amplitudes of sensor outputs and decreased for smaller amplitudes thereof.

In the exemplary embodiment described so far, the switch function for driving the vibrators 80 is assigned to the lower operation buttons 34. However, this assignment may be controlled by the game device 10. For example, when it is ready for an automatic fire in a game, the game device 10 may set the input and output paths within the controller 20 such that operation input signals which are input to the lower operation buttons 34 are supplied directly to the vibration control unit 70. When an automatic fire cannot be effected in the game, operation input signals which are input to the lower operation buttons 34 are handled the same way as operation input signals to the other operation buttons.

For example, the application processing unit 110 determines whether the automatic fire function is usable or not based on the progress of an application, and when it is usable, performs a control to connect a path from the lower operation buttons 34 on the controller 20 to the vibration control unit 70. And when the automatic fire function is not used, the application processing unit 110 cuts off the path from the lower operation buttons 34 to the vibration control unit 70. The controller 20 has multiple types of register maps defining the connection paths of the operation buttons, and a path control is performed at the controller 20 when the application processing unit 110 instructs a switching of the register maps to the main control unit 50 of the controller 20.

In this manner, the game device 10 recognizes whether automatic fire is possible or not, so that the game operation data supply unit 106 can use sensor output signal values sent during a period when auto fire is possible as input signals for automatic fire. On the other hand, the game operation data supply unit 106 may discard the sensor output signal values sent during the period when the automatic fire mode is off.

The present invention has been described in conjunction with the exemplary embodiments. These exemplary embodiments are given solely by way of illustration. It will be understood by those skilled in the art that various modifications to the combination of each component and each process thereof are possible and that such modifications are also within the scope of the present invention. For example, though a description has been given of a case where there are two vibrators 80a and 80b in the exemplary embodiments, the number of vibrators 80 may be one or three or more.

The vibration of the controller 20 is effected according to the amount of operation of the lower operation button 34. However, the arrangement may be such that the vibration of the controller 20 reaches its maximum at a position where the press on the lower operation button 34 is not at its maximum. For example, a vibration frequency equal to the natural frequency of the controller 20 may be set at the middle point of pressing on the lower operation button 34, which will result in an arrangement where a maximum vibration is obtained when the user presses the lower operation button 34 to the middle point.

Figure 12:
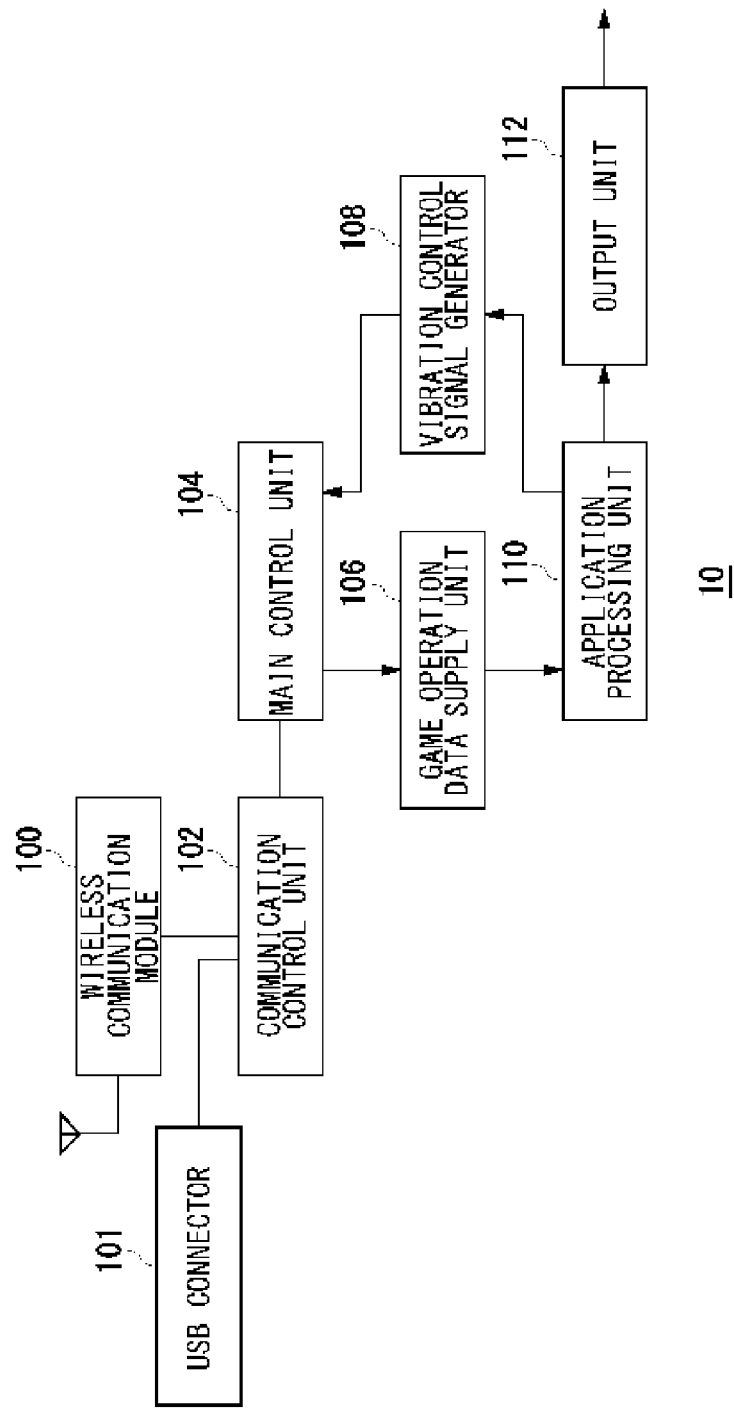
FIG. 12 shows a modification of the structure of a game device.

FIG. 12 shows a variation of the structure of the game device 10. In the exemplary embodiments so far described, drive control signals are produced within the controller 20. However, the game device 10 as shown in FIG. 12 has a function of producing drive control signals from operation input values sent from the controller 20. The structure of the game device 10 of FIG. 12 differs from that of the game device 10 as shown in FIG. 8 in that it includes a vibration control signal generator 108 for producing vibration control signals.

The application processing unit 110, upon receiving operation input values on a predetermined operation button from the game operation data supply unit 106, instructs the vibration control signal generator 108 to produce a vibration control signal. This predetermined operation button is a button assigned as the switch to drive the vibrator 80 by the application processing unit 110, which may, for instance, be a lower operation button 34 capable of effecting an analog input signal. In this modification, the operation input signal which is input to the lower operation button 34 at the controller 20 is transmitted from the wireless communication module 72 to the game device 10 together with operation input signal on the other operation buttons. The operation input signal on the lower operation button 34 is supplied to the application processing unit 110 by way of the wireless communication module 100, the communication control unit 102, the main control unit 104, and the game operation data supply unit 106.

The vibration control signal generator 108 produces a vibration control signal according to the instruction from the application processing unit 110 and supplies it to the main control unit 104. Upon receiving the vibration control signal from the main control unit 104, the communication control unit 102 has the vibration control signal transmitted from the wireless communication module 100 to the controller 20.

At the controller 20, the main control unit 50, upon receiving the vibration control signal, supplies it to the vibration control unit 70. In this modification, therefore, the vibration control unit 70, which does not produce vibration control signals on its own, drives the vibrator 80 by utilizing the vibration control signal sent from the game device 10. As explained with the exemplary embodiments, the sensor output signal value detected by the motion sensor is transmitted periodically from the wireless communication module 72 to the game device 10. While the vibration control signal generator 108 is generating a vibration control signal to drive the vibrator 80, the sensor output signal value to be sent is processed as input signals for an automatic fire by the application processing unit 110.

Figure 13:
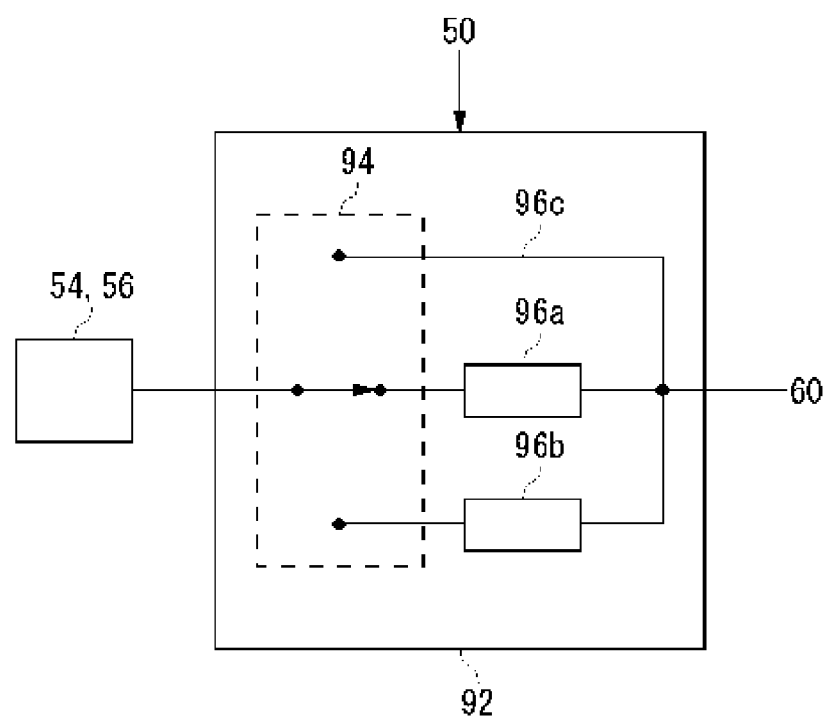
FIG. 13 shows a filter circuit for filtering the output signal of a motion sensor.

FIG. 13 shows a filter circuit for filtering the output signal of a motion sensor. The filter circuit 92 is disposed between a set of an acceleration sensor 54 and an angular velocity sensor 56 and an ADC 60. The filter circuit 92 is configured so that an LPF 96a having a predetermined cutoff frequency and a BPF 96b having a predetermined passband can be used selectively by a switch 94. For example, the arrangement may be such that the LPF 96a has a cutoff frequency of 15 Hz and the BPF 96b has a passband within a predetermined range of 15 Hz or above. Also, the switch 94 can select a bypass route 96c which does not pass through the LPF 96a and the BPF 96b.

When the output signal of the motion sensor in response to the movement of the controller 20 by the user is utilized as game operation data, the main control unit 50 has the switch 94 connect the sensor output to the LPF 96a. This happens, for instance, when the controller 20 is operated on the assumption of it being a steering wheel of a vehicle. In such a case, the vibration frequency given by the user to the controller 20 is assumed to be about 15 Hz at most, so that the motion of the controller 20 caused by the action of the user can be extracted properly by filtering the sensor output signal by the LPF 96a. It is to be noted that when the vibrator 80 is not driven, the main control unit 50 may have the switch 94 connect the sensor output to the bypass route 96c.

On the other hand, when the motion of the controller 20 caused by the drive of the vibrator 80 is to be extracted, the main control unit 50 has the switch 94 connect the sensor output to the BPF 96b. Where the controller 20 vibrates due to the drive of the vibrator 80, the vibration frequency of the controller 20 is higher than 15 Hz. Therefore, by filtering the sensor output signal by the BPF 96b, it is possible to remove the motion component of the controller 20 caused by the action of the user and thus extract the motion of the controller 20 caused by the drive of the vibrator 80 properly.

What is claimed is:

1. A game system comprising a game controller and a game device for executing a game application,
the game controller including:
at least one vibrator configured to be driven by a vibration control signal;
an operation button configured to be operated by a user;
a vibration control unit configured to convert an operation input signal, which is generated by an operation of the operation button, into the vibration control signal so as to be supplied to the at least one vibrator;
a motion sensor configured to detect vibration caused by a drive of the at least one vibrator and output an analog signal based on the detected vibration;
an analog-to-digital converter configured to analog-to-digital convert the analog signal of the motion sensor into a sensor output signal; and
a first communication module configured to supply the sensor output signal, which has been analog-to-digital converted, to the game device, and
the game device including:
a second communication module configured to receive the sensor output signal from the game controller;
an application processing unit configured to carry out a processing of the game application; and
a supply unit configured to supply the received sensor output signal to the application processing unit as game operation data,
wherein the application processing unit reflects the game operation data received from the supply unit, in the processing of the game application.

2. A game system according to claim 1, wherein the vibration control unit determines vibration frequency or vibration amplitude of the at least one vibrator according to an operation amount of the operation button.

3. A game system according to claim 1, when the sensor output signal going above a reference value from a value equal to or below the reference value is detected or when the sensor output signal going down to or below the reference value from a value above the reference value is detected, the supply unit generates game operation data and supplies the generated game operation data to the application processing unit.

4. A game system according to claim 1, wherein the application processing unit fires virtual bullets in succession, based on the game operation data received from the supply unit.

5. A game controller for transmitting game operation data to a game device, the game controller comprising:
at least one vibrator configured to be driven by a vibration control signal;
a motion sensor configured to detect a motion of the game controller caused by a drive of the at least one vibrator and output an analog signal;
an operation button configured to be operated by a user wherein the operation of the operation button drives the at least one vibrator;
a vibration control unit configured to convert an operation input signal, which is generated by an operation of the operation button, into the vibration control signal so as to be supplied to the at least one vibrator;
an analog-to-digital converter configured to analog-to-digital convert the analog signal of the motion sensor into a sensor output signal; and
a communication module configured to supply the sensor output signal, which has been analog-to-digital converted, to the game device in which the sensor output signal is comprised in the game operation data.

6. A game system comprising a game controller and a game device for executing a game application,
the game controller including:

an operation button configured to be operated by a user so as to generate a vibration control signal in the game device;

at least one vibrator configured to be driven by the vibration control signal;

a motion sensor configured to detect vibration caused by a drive of the at least one vibrator and output an analog signal based on the detected vibration;

an analog-to-digital converter configured to analog-to-digital convert the analog signal of the motion sensor into a sensor output signal; and a first communication module configured to supply the sensor output signal, which has been analog-to-digital converted, and an operation input signal, which is generated by an operation of the operation button, to the game device, and the game device including:

a second communication module configured to receive the sensor output signal and the operation input signal from the game controller;

an application processing unit configured to carry out a processing of a game application;

a vibration control signal generator configured to generate the vibration control signal based on the operation input signal received by the second communication module; and a supply unit configured to supply the received sensor output signal to the application processing unit as game operation data, wherein the application processing unit reflects the game operation data received from the supply unit, in the processing of the game application, and wherein the second communication module supplies the generated vibration control signal to the game controller.

7. A game system according to claim 6, when the sensor output signal going above a reference value from a value equal to or below the reference value is detected or when the sensor output signal going down to or below the reference value from a value above the reference value is detected, the supply unit generates and supplies the game operation data to the application processing unit.

8. A game system according to claim 6, wherein the application processing unit fires virtual bullets in succession, based on the game operation data received from the supply unit.

* * * * *